United States Patent
Thompson

(10) Patent No.: US 10,836,557 B2
(45) Date of Patent: Nov. 17, 2020

(54) INSULATED BOTTLE

(71) Applicant: Shorefield Holdings LLC, Lima, OH (US)

(72) Inventor: Brendan Thompson, Waynesfield, OH (US)

(73) Assignee: Shorefield Holdings LLC, Lima, OH (US)

( * ) Notice: Subject to any disclaimer, the term of this patent is extended or adjusted under 35 U.S.C. 154(b) by 0 days.

(21) Appl. No.: 15/136,921

(22) Filed: Apr. 23, 2016

(65) Prior Publication Data

US 2017/0305640 A1    Oct. 26, 2017

(51) Int. Cl.
| | | |
|---|---|---|
| *B65D 81/38* | (2006.01) | |
| *B65D 1/02* | (2006.01) | |
| *B65D 77/04* | (2006.01) | |
| *A47J 41/00* | (2006.01) | |
| *B65D 23/08* | (2006.01) | |

(52) U.S. Cl.
CPC ...... *B65D 81/3841* (2013.01); *A47J 41/0077* (2013.01); *B65D 1/0223* (2013.01); *B65D 1/0246* (2013.01); *B65D 23/0878* (2013.01); *B65D 77/0486* (2013.01); *B65D 77/0493* (2013.01); *B65D 81/3869* (2013.01)

(58) Field of Classification Search
CPC .............. B65D 81/3841; B65D 1/0223; B65D 77/0493; B65D 77/0486; B65D 81/3869; A47J 41/0077
USPC ............ 220/592.12, 592.16, 592.17, 592.23
See application file for complete search history.

(56) References Cited

U.S. PATENT DOCUMENTS

| | | |
|---|---|---|
| 1,641,155 A | 9/1927 | Clausing |
| D247,279 S | 2/1978 | Marceca |
| D294,218 S | 2/1988 | Johnson |
| 4,832,968 A | 5/1989 | Forage et al. |
| 4,892,429 A | 1/1990 | Giannuzzi |
| 5,085,431 A | 2/1992 | McGuire |
| 5,160,225 A | 11/1992 | Chern |
| 5,316,193 A | 5/1994 | Heiberger |
| 5,441,118 A | 8/1995 | Cruz, Jr. |
| 5,494,198 A | 2/1996 | Heiberger |
| D368,943 S | 4/1996 | Johnson |

(Continued)

FOREIGN PATENT DOCUMENTS

FR    712629    10/1931

OTHER PUBLICATIONS

Ex Parte Quayle Action cited in U.S. Appl. No. 29/557,096 dated Apr. 25, 2017, 4 pgs.

(Continued)

*Primary Examiner* — Fenn C Mathew
*Assistant Examiner* — Jennifer Castriotta
(74) *Attorney, Agent, or Firm* — Cooper Legal Group, LLC

(57) ABSTRACT

An insulated bottle includes an inner container having an inner wall that defines an inner chamber within which a product is received. The insulated bottle includes an outer container having an outer wall that defines an outer chamber. The inner container is received within the outer chamber of the outer container. A space is defined between the inner wall and the outer wall. The insulated bottle includes a label shrink wrapped to an outer surface of the inner wall of the inner container. The label is positioned within the space defined between the inner wall and the outer wall.

20 Claims, 9 Drawing Sheets

(56) References Cited

U.S. PATENT DOCUMENTS

| | | | |
|---|---|---|---|
| 5,529,217 A * | 6/1996 | Siegel | A45F 3/20 |
| | | | 215/229 |
| 5,901,882 A | 5/1999 | Seigel | |
| 5,944,486 A | 8/1999 | Hodgkins, Jr. | |
| 5,971,184 A * | 10/1999 | Krishnakumar | B65D 23/102 |
| | | | 215/379 |
| D421,557 S | 3/2000 | Wang | |
| D422,173 S | 4/2000 | He | |
| 6,164,469 A | 12/2000 | Sartore | |
| 6,379,032 B1 | 4/2002 | Sorensen | |
| 6,419,436 B1 | 7/2002 | Gaudron | |
| D466,371 S | 12/2002 | Parker | |
| D528,862 S | 9/2006 | Li | |
| D566,468 S | 4/2008 | Sandy | |
| D593,141 S | 5/2009 | Gaudron | |
| D609,969 S | 2/2010 | McKinney | |
| 7,722,299 B2 | 5/2010 | Lenander | |
| 7,753,234 B1 | 7/2010 | Heiberger | |
| D626,409 S | 11/2010 | Hooley | |
| D628,483 S | 12/2010 | McKinney | |
| D637,871 S | 5/2011 | Frank | |
| 7,934,895 B2 | 5/2011 | Ernst | |
| D641,587 S | 7/2011 | Colburn | |
| 8,029,215 B2 | 10/2011 | Gentry | |
| D657,251 S | 4/2012 | Rinderer | |
| 8,192,123 B2 | 6/2012 | Ernst | |
| 8,210,375 B2 | 7/2012 | Heiberger | |
| 8,584,877 B2 | 11/2013 | Heiberger | |
| D696,551 S | 12/2013 | Meyers | |
| 8,646,663 B2 | 2/2014 | Heiberger | |
| D717,601 S | 11/2014 | Dixon | |
| D739,174 S | 9/2015 | Elsaden | |
| D741,637 S | 10/2015 | Palermo | |
| D747,624 S | 1/2016 | Walker | |
| 9,248,423 B2 | 2/2016 | Cerasani | |
| D764,232 S | 8/2016 | Marina et al. | |
| D771,990 S | 11/2016 | Horowitz | |
| D775,518 S | 1/2017 | Torres Carpio | |
| D775,893 S | 1/2017 | Buckley et al. | |
| D779,872 S | 2/2017 | Bergstrom | |
| D780,516 S | 3/2017 | Cornelius | |
| D781,104 S | 3/2017 | Cerasani | |
| 9,587,662 B2 | 3/2017 | Glass | |
| 2002/0130600 A1 | 9/2002 | Bigio | |
| 2004/0047231 A1 | 3/2004 | Coll | |
| 2005/0031434 A1 | 2/2005 | Gaudron | |
| 2005/0079027 A1 | 4/2005 | Ernst | |
| 2005/0242103 A1 * | 11/2005 | Thomas | A47G 19/2227 |
| | | | 220/717 |
| 2006/0051491 A1 | 3/2006 | Levitt | |
| 2010/0224631 A1 | 11/2010 | Roth | |
| 2010/0290849 A1 | 11/2010 | Mirchandami | |
| 2012/0195704 A1 | 8/2012 | White | |
| 2014/0231378 A1 | 8/2014 | Roos | |
| 2014/0363244 A1 | 12/2014 | Allen | |
| 2014/0363249 A1 | 12/2014 | Oka | |
| 2016/0223005 A1 | 8/2016 | Hettich | |

OTHER PUBLICATIONS

Reply Ex Parte Quayle Action cited in U.S. Appl. No. 29/557,096 dated Jun. 26, 2017, 4 pgs.

Notice of Allowance cited in U.S. Appl. No. 29/557,096 dated Sep. 13, 2017, 5 pgs.

Ex Parte Quayle Action cited in U.S. Appl. No. 29/557,098 dated Apr. 28, 2017, 5 pgs.

Reply Ex Parte Quayle Action cited in U.S. Appl. No. 29/557,098 dated Jun. 26, 2017, 5 pgs.

Notice of Allowance cited in U.S. Appl. No. 29/557,098 dated Aug. 8, 2017, 5 pgs.

* cited by examiner

INSULATED BOTTLE

TECHNICAL FIELD

The instant application is directed towards a bottle. For example, the instant application is directed towards an insulated bottle for receiving a product.

BACKGROUND

Insulated bottles can receive a product, such as a fluid product. Insulated bottles may be used, for example, to maintain a temperature (e.g., hot, cold, etc.) of a fluid product.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, an insulated bottle comprises an inner container having an inner wall that defines an inner chamber within which a product is received. The insulated bottle comprises an outer container having an outer wall that defines an outer chamber. The inner container is configured to be received within the outer chamber of the outer container. A space may be defined between the inner wall and the outer wall. The insulated bottle comprises a label shrink wrapped to an outer surface of the inner wall of the inner container. The label is positioned within the space defined between the inner wall and the outer wall.

In an example, an insulated bottle comprises an inner container extending between a first inner end and a second inner end. The inner container has an inner wall that defines an inner chamber within which a product is received. The inner wall defines an inner opening, in fluid communication with the inner chamber, at the first inner end. An outer container extends between a first outer end and a second outer end. The outer container has an outer wall that defines an outer chamber and an outer opening at the first outer end. A first inner portion of the inner container is configured to be received within the outer chamber of the outer container and a second inner portion of the inner container is not received within the outer chamber of the outer container. The first outer end of the outer container is attached to the inner container at an attachment location between the first inner end and the second inner end of the inner container. A space is defined between the inner wall and the outer wall. A label is adhered to an outer surface of the inner wall of the inner container. The label is positioned within the space defined between the inner wall and the outer wall.

In an example, a method of manufacturing an insulated bottle is provided. The method comprises surrounding an inner container with a label. The method comprises shrink wrapping the label onto the inner container to form an inner structure. The method comprises inserting the inner structure within an outer chamber defined by an outer wall of an outer container. The method comprises attaching a first outer end of the outer container to the inner container.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
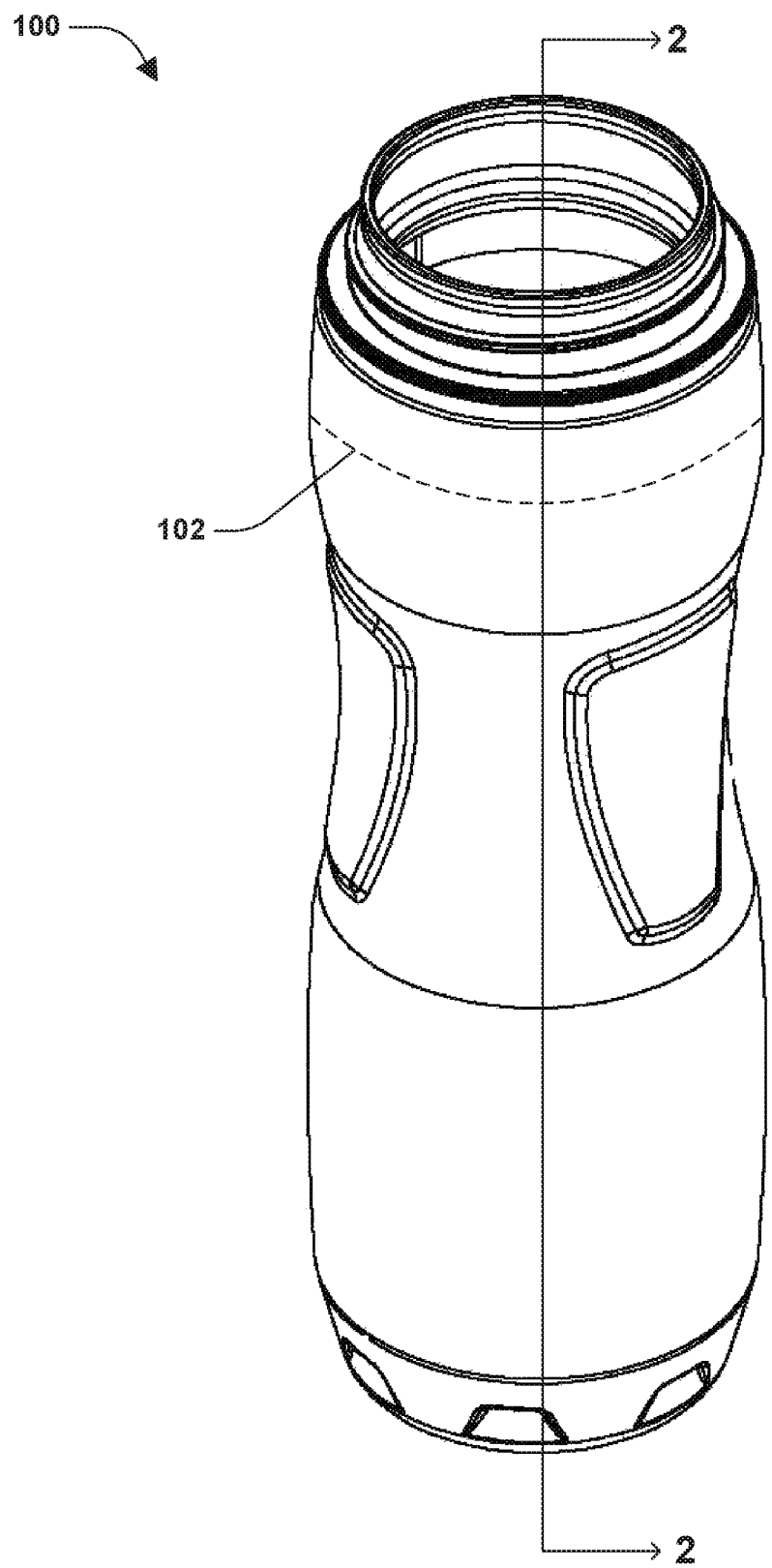
FIG. 1 is an illustration of an example insulated bottle.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Referring to FIG. 1, an example insulated bottle 100 is illustrated. The insulated bottle 100 can be used to assist in storing and selectively dispensing a product, such as a liquid (e.g., water, sports drink, milk, juice, etc.). The product 102 may be maintained at a temperature that is warmer or colder than ambient air temperature. Due to the design of the insulated bottle 100, the product 102 can tend to maintain a temperature over a longer period of time.

Figure 2:
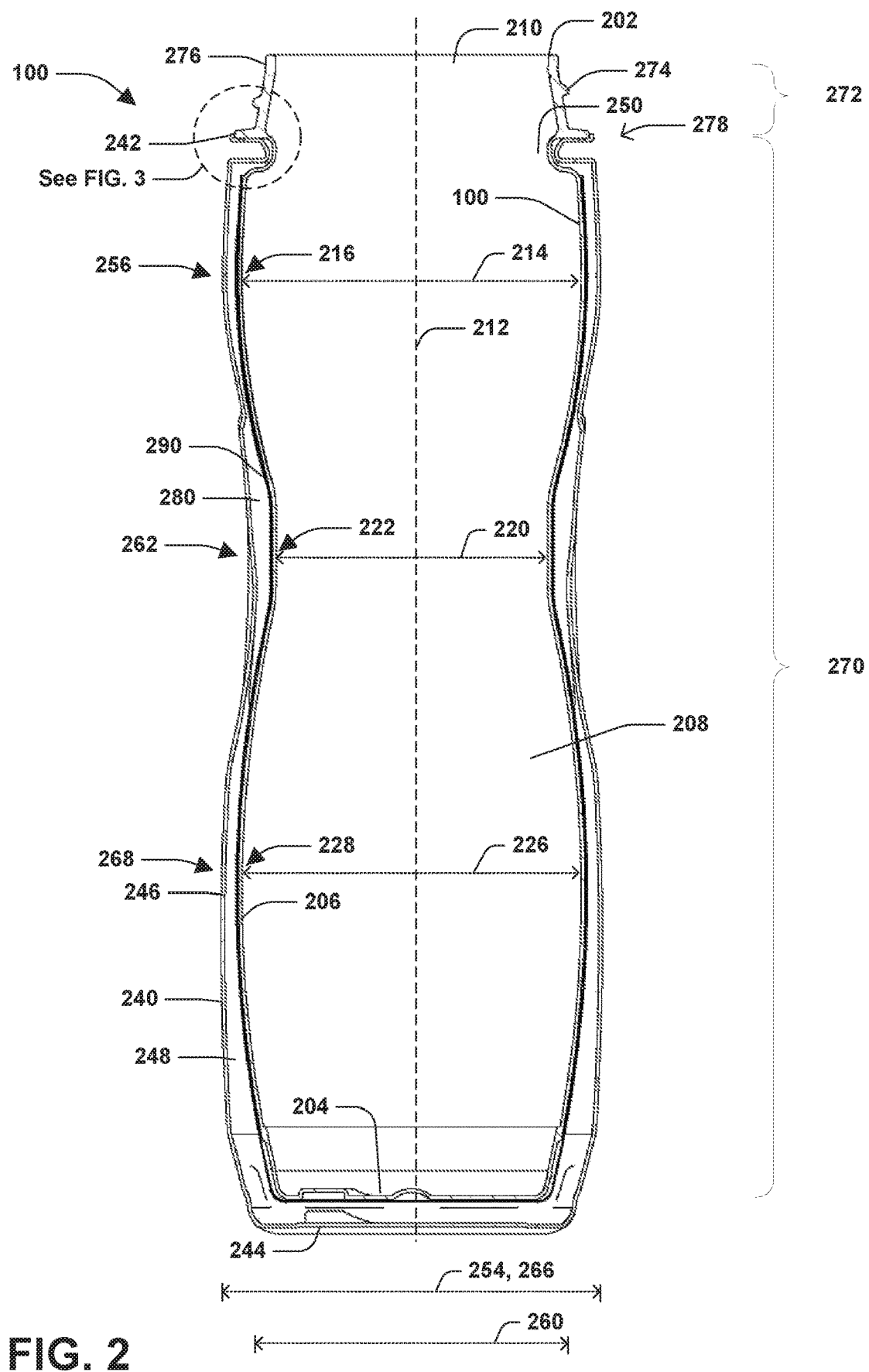
FIG. 2 is an illustration of a sectional view of an example insulated bottle.

Referring to FIG. 2, a sectional illustration of the insulated bottle 100 is illustrated along 2-2 of FIG. 1. The insulated bottle 100 comprises an inner container 200. The inner container 200 can extend between a first inner end 202 and a second inner end 204. The inner container 200 has an inner wall 206 that defines an inner chamber 208 within which the product 102 (e.g., a liquid and/or a non-liquid) is received. The inner container 200 comprises any number of resilient, flexible or non-flexible materials that are resistant to corrosion, breakage, fracturing, leakage, etc. For example, the inner container 200 may comprise plastics, composite materials, polytetrafluoroethylene (PTFE), or the like. The inner container 200 can be formed in any number of ways, such as through a blow molding process, for example.

The inner wall 206 can define an inner opening 210 at the first inner end 202. In an example, the inner opening 210 is in fluid communication with the inner chamber 208. As such, the inner container 200 can receive the product 102 through the inner opening 210 and into the inner chamber 208. In the illustrated examples, the inner opening 210 may be substantially circular, though, in other examples, the inner opening 210 can have other shapes.

The inner container 200 can extend along a first axis 212 between the first inner end 202 and the second inner end 204. In an example, the inner container 200 extends substantially linearly along the first axis 212. In other examples, however, the inner container 200 is not limited to extending substantially linearly and, instead, may extend along a curved axis and/or may have bends, curves, or the like.

In some examples, the inner container 200 can have a substantially constant cross-sectional size along the first axis 212 between the first inner end 202 and the second inner end 204. In other examples, such as in the illustrated examples, the inner container 200 can have a non-constant cross-sectional size along the first axis 212 between the first inner end 202 and the second inner end 204.

In an example, the inner container 200 can have a first cross-sectional size 214 at a first location 216. The inner container 200 can have a second cross-sectional size 220 at a second location 222. The inner container 200 can have a third cross-sectional size 226 at a third location 228. In an example, the second location 222 may be located between the first location 216 and the third location 228. The first location 216 may be located in proximity to the first inner end 202 while the third location 228 may be located in proximity to the second inner end 204. The second location 222 may be located at a central region of the inner container 200.

In the illustrated example, the inner container 200 can have an hourglass shape along the first axis 212. For example, starting at the first inner end 202 and moving along the first axis 212 towards the second inner end 204, the inner container 200 can have a gradually increasing cross-sectional size until reaching the first cross-sectional size 214 at the first location 216. The inner container 200 can then have a decreasing cross-sectional size until reaching the second cross-sectional size 220 at the second location 222. The inner container 200 can then have an increasing cross-sectional size until reaching the third cross-sectional size 226 at the third location 228. The inner container 200 can then have a decreasing cross-sectional size from the third location 228 to the second inner end 204.

In an example, the first cross-sectional size 214 and the third cross-sectional size 226 can represent maximum cross-sectional sizes of the inner container 200, while the second cross-sectional size 220 can represent a minimum cross-sectional size of the inner container 200. In an example, the first cross-sectional size 214 may be greater than, equal to, or less than the third cross-sectional size 226.

The insulated bottle 100 comprises an outer container 240. The outer container 240 can extend between a first outer end 242 and a second outer end 244. The outer container 240 has an outer wall 246 that defines an outer chamber 248 within which the inner container 200 is received. The outer container 240 comprises any number of resilient, flexible or non-flexible materials that are resistant to corrosion, breakage, fracturing, leakage, etc. For example, the outer container 240 may comprise plastics, composite materials, polytetrafluoroethylene (PTFE), or the like. In some examples, the inner container 200 and the outer container 240 may comprise the same material or different materials. In an example, the outer container 240 may be at least partially transparent or clear, such that the contents of the outer container 240 may be visible to a user through the outer wall 246 of the outer container 240. The outer container 240 can be formed in any number of ways, such as through a blow molding process, for example.

The outer wall 246 can define an outer opening 250 at the first outer end 242. In an example, the outer opening 250 is in fluid communication with the outer chamber 248. As such, the outer container 240 can receive the inner container 200 through the outer opening 250 and into the outer chamber 248. In the illustrated examples, the outer opening 250 may be substantially circular, though, in other examples, the outer opening 250 can have other shapes.

The outer container 240 can extend along the first axis 212 between the first outer end 242 and the second outer end 244. In an example, the outer container 240 extends substantially linearly along the first axis 212. In other examples, however, the outer container 240 is not limited to extending substantially linearly and, instead, may extend along a curved axis and/or may have bends, curves, or the like.

In some examples, the outer container 240 can have a substantially constant cross-sectional size along the first axis 212 between the first outer end 242 and the second outer end 244. In other examples, such as in the illustrated examples, the outer container 240 can have a non-constant cross-sectional size along the first axis 212 between the first outer end 242 and the second outer end 244.

In an example, the outer container 240 can have a first cross-sectional size 254 at a first location 256. The outer container 240 can have a second cross-sectional size 260 at a second location 262. The outer container 240 can have a third cross-sectional size 266 at a third location 268. In an example, the second location 262 may be located between the first location 256 and the third location 268. The first location 256 may be located in proximity to the first outer end 242 while the third location 268 may be located in proximity to the second outer end 244. The second location 262 may be located at a central region of the outer container 240.

In the illustrated example, the outer container 240 can have an hourglass shape along the first axis 212. For example, starting at the first outer end 242 and moving along the first axis 212 towards the second outer end 244, the outer container 240 can have a gradually increasing cross-sectional size until reaching the first cross-sectional size 254 at the first location 256. The outer container 240 can then have a decreasing cross-sectional size until reaching the second cross-sectional size 260 at the second location 262. The outer container 240 can then have an increasing cross-sectional size until reaching the third cross-sectional size 266 at the third location 268. The outer container 240 can then have a decreasing cross-sectional size from the third location 268 to the second outer end 244.

In an example, the first cross-sectional size 254 and the third cross-sectional size 266 can represent maximum cross-sectional sizes of the outer container 240, while the second cross-sectional size 260 can represent a minimum cross-sectional size of the outer container 240. In an example, the first cross-sectional size 254 may be greater than, equal to, or less than the third cross-sectional size 266.

In an example, the inner container 200 can have a smaller cross-sectional size than the outer container 240 at corresponding locations (e.g., first locations 216, 256, second locations 222, 262 and third locations 228, 268). In some examples, a cross-sectional size of a portion of the inner container 200 may be larger than a cross-sectional size of a portion of the outer container 240. In such an example, a maximum cross-sectional size of the inner container 200 may be larger than a minimum cross-sectional size of the outer container 240. In the illustrated example, the first cross-sectional size 214 and/or the third cross-sectional size 226 of the inner container 200 may be larger than the second cross-sectional size 260 of the outer container 240.

The inner container 200 and the outer container 240 can have a substantially matching shape. For example, the inner container 200 and the outer container 240 can have substantially matching hourglass shapes. As such, the inner wall 206 of the inner container 200 can extend substantially parallel to and spaced apart from the outer wall 246 of the outer container 240.

The non-constant cross-sectional size of the inner container 200 and outer container 240 is beneficial in a number of ways. In an example, the non-constant cross-sectional size of the inner container 200 can allow for easier adhesion of a label to the inner wall 206. In another example, the non-constant cross-sectional size of the inner container 200 and the outer container 240 can have ornamental benefits by being more visually attractive. In yet another example, the non-constant cross-sectional size of the inner container 200 and the outer container 240 can reduce the likelihood of the inner container 200 from being inadvertently removed from the outer chamber 248 of the outer container 240. For example, due to the third cross-sectional size 226 of the inner container 200 at the third location 228 being larger than the second cross-sectional size 260 of the outer container 240 at the second location 262, the likelihood of the inner container 200 from being removed from the outer container 240 is reduced.

In an example, at least a portion of the inner container 200 may be received within the outer container 240, while another portion may extend outwardly from the outer container 240. For example, a first inner portion 270 of the inner container 200 may be received within the outer chamber 248 of the outer container 240. A second inner portion 272 of the inner container 200 may not be received within the outer chamber 248 of the outer container 240. Rather, the second inner portion 272 may extend outwardly through the outer opening 250 and from the first outer end 242 of the outer container 240.

As such, in this example, less than all of the inner container 200 may be received within the outer chamber 248 of the outer container 240. The second inner portion 272 of the inner container 200 may comprise a threaded portion 274 on an outer surface 276 of the inner wall 206. The threaded portion 274 can engage a top (e.g., a cap, a cover, a nozzle, etc.), such that the top can be selectively screwed onto and removed from the second inner portion 272 of the inner container 200. That is, the top may have a corresponding threaded portion that can engage and mate with the threaded portion 274 of the inner container 200.

The outer container 240 may be attached to the inner container 200 to limit the inner container 200 from being removed from the outer chamber 248 of the outer container 240. For example, the first outer end 242 of the outer container 240 may be attached to the inner container 200 at an attachment location 278 that is between the first inner end 202 and the second inner end 204 of the inner container 200. In such an example, the attachment location 278 can be spaced a distance apart from the first inner end 202 and from the second inner end 204 of the inner container 200. By being spaced apart, the attachment location 278 can accommodate for the top to be threaded onto the second inner portion 272 of the inner container 200.

With the inner container 200 and the outer container 240 attached, a space 280 may be defined between the inner wall 206 of the inner container 200 and the outer wall 246 of the outer container 240. This space 280 can be defined along a perimeter (e.g., circumference) of the inner container 200, and between the second inner end 204 of the inner container 200 and the second outer end 244 of the outer container 240.

In an example, a label 290 can be adhered to the outer surface 276 of the inner wall 206 of the inner container 200. The label 290 may comprise, for example, a foil material, a foam material, a bag, a shrinkable sleeve, heat shrink tubing, and/or other materials including, but not limited to, shrinkable plastic, nylon, polyolefin, PTFE, Viton, polyvinylidene fluoride (PVDF), fluorinated ethylene propylene (FEP), elastomeric materials, silicone rubber, polyvinyl chloride (PVC), polyethylene, polypropylene, etc. Indeed, the label 290 may comprise any number of different materials that can be adhered to the inner container 200, wherein some of the materials may comprise a shrink wrap or shrink film material that can shrink when heat is applied.

The label 290 may contain a number of different types of visual indicia 400 (e.g., visual indicia 400 illustrated in FIG. 4) for a user to see. For example, the label 290 may comprise graphics, text, images, pictures, advertisements, logos, etc. The label 290 can be adhered to the outer surface 276 in any number of ways. For example, the label 290 can be shrink wrapped to the outer surface 276. In such an example, the label 290 and/or the inner container 200 can be heated to a predetermined temperature for a predetermined amount of time. This heating can cause the label 290 to deform and adhere to the outer surface 276 such that the label 290 can form a shape that matches the inner container 200.

With the label 290 adhering to the outer surface 276 of the inner container 200, the label 290 can be positioned within the space 280 between the inner wall 206 and the outer wall 246. The label 290 can extend along the first axis 212 and may have a non-constant cross-sectional size along the first axis 212. For example, the label 290 can have a substantially matching cross-sectional size and shape as the inner container 200 (e.g., by having the first cross-sectional size 214, the second cross-sectional size 220, the third cross-sectional size 226, etc.).

Figure 3:
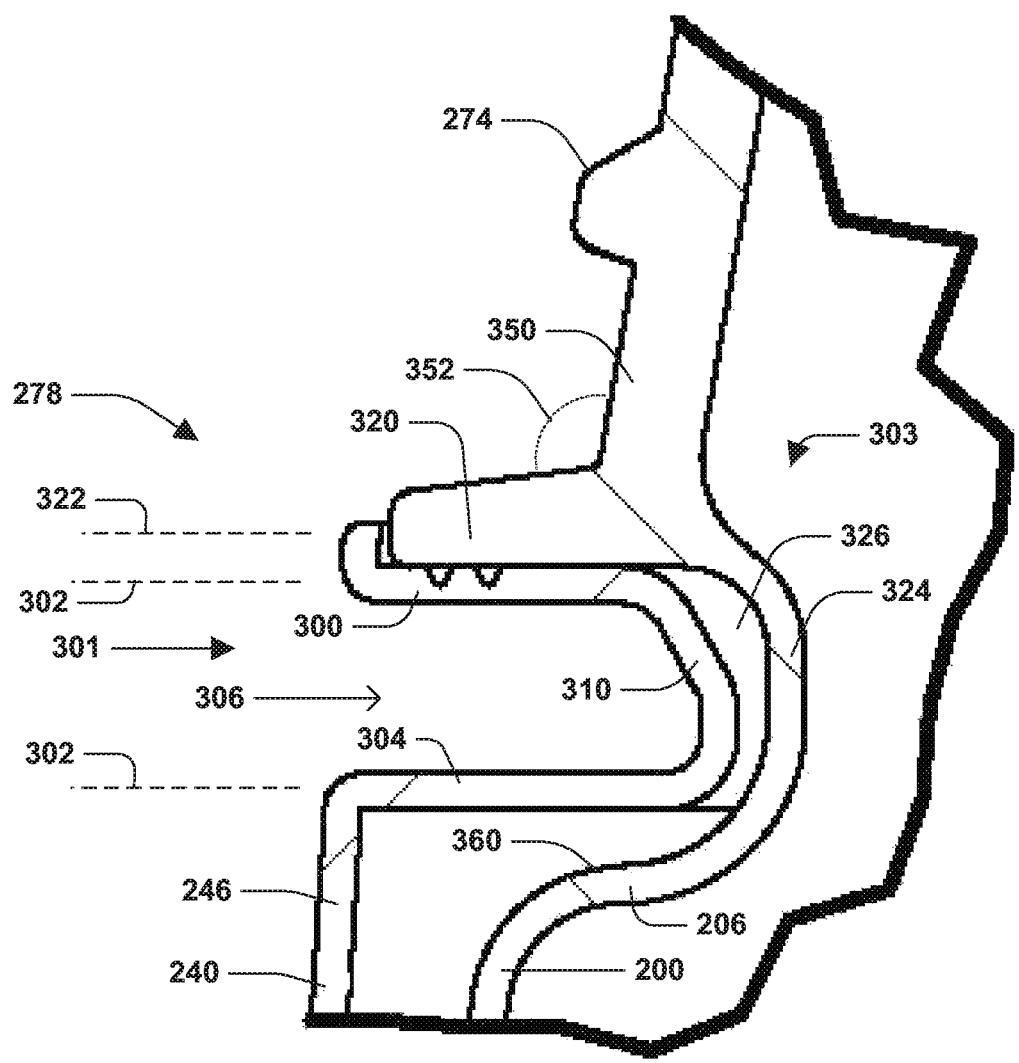
FIG. 3 is an illustration of an attachment location of an example insulated bottle.

Turning to FIG. 3, the attachment location 278 is illustrated. At the attachment location 278, an outer attachment portion 301 can be attached to an inner attachment portion 303. At the attachment location 278, the outer wall 246 of the outer container 240 can have an outer attachment flange 300. The outer attachment flange 300 can extend along an outer plane 302 that is substantially perpendicular to the first axis 212 along which the outer container 240 extends. In an example, the outer attachment flange 300 can extend circumferentially around the outer container 240 at the first outer end 242. In this example, the outer attachment flange 300 can extend radially outwardly from the outer wall 246.

The outer wall 246 of the outer container 240 can have an outer attachment wall 304. The outer attachment wall 304 may be spaced a distance apart from the outer attachment flange 300 to define a gap 306 therebetween. In an example, the outer attachment wall 304 can extend along an outer wall plane 308 that is substantially perpendicular to the first axis 212 along which the outer container 240 extends. In an example, the outer wall plane 308 is substantially parallel to the outer plane 302, such that the outer attachment wall 304 is substantially parallel to the outer attachment flange 300. In an example, the outer attachment wall 304 can extend circumferentially around the outer container 240 spaced a distance apart from the first outer end 242.

An intermediate wall 310 can extend between the outer attachment flange 300 and the outer attachment wall 304. In an example, the intermediate wall 310 can extend along the first axis 212, with one end attached to the outer attachment flange 300 and an opposing end attached to the outer attachment wall 304. In an example, the intermediate wall 310 may be angled so as not to extend parallel to the first axis 212. That is, the intermediate wall 310 can extend along a direction that is substantially non-parallel to the outer attachment flange 300 and the outer attachment wall 304. In this example, from the outer attachment flange 300, the intermediate wall 310 can be angled inwardly (e.g., by extending towards the first axis 212) until reaching the outer attachment wall 304.

The inner wall 206 of the inner container 200 can have an inner attachment flange 320. The inner attachment flange 320 can extend along an inner plane 322 that is substantially perpendicular to the first axis 212 along which the inner container 200 extends. In an example, the inner attachment flange 320 can extend circumferentially around the inner container 200 spaced a distance apart from the first inner end 202. In this example, the inner attachment flange 320 can extend radially outwardly from the inner wall 206. In an example, the inner plane 322 may be substantially parallel to the outer plane 302, with the inner plane 322 located in closer proximity to the first inner end 202 than the outer plane 302.

The inner wall 206 of the inner container 200 can define an attachment groove 326 that extends circumferentially around the inner container 200. The attachment groove 326 can be bounded at an inner radial side by an inner attachment wall 324. The attachment groove 326 may be sized to receive the intermediate wall 310 of the outer container 240 and portions of the outer attachment flange 300 and the outer attachment wall 304.

The outer attachment flange 300 can be attached to the inner attachment flange 320 such that the outer container 240 can be attached to the inner container 200. In an example, the outer attachment flange 300 and the inner attachment flange 320 can be pressed into contact, such as with a mechanical force applicator. In such an example, a portion of the force applicator may be inserted into the gap 306 to assist in holding and/or securing the outer attachment flange 300. With a force being applied to the outer attachment flange 300 and the inner attachment flange 320, heat can be applied to the outer attachment flange 300 and the inner attachment flange 320. This heat can cause at least some degree of melting and/or bonding between the outer attachment flange 300 and the inner attachment flange 320. In an example, the combination of the force and the heat being applied can cause attachment of the outer attachment flange 300 and the inner attachment flange 320 at the attachment location 278.

The inner container 200 may comprise an inner end wall 350 that extends from the inner attachment flange 320. In an example, the inner end wall 350 can extend from the inner attachment flange 320 towards the first inner end 202. In this example, the inner end wall 350 can extend at an angle with respect to the inner attachment flange 320 that is non-perpendicular. For example, the inner end wall 350 and the inner attachment flange 320 can define an angle 352 that is greater than 90 degrees but less than 180 degrees. In an example, the angle 352 may be between about 100 degrees to about 120 degrees. In this example, the inner end wall 350 can extend non-parallel to the first axis 212. Rather, the inner end wall 350 can project from the inner attachment flange 320 towards the first axis 212 (e.g., towards a center of the inner container 200), such that the inner end wall 350 defines a larger cross-sectional size adjacent to the inner attachment flange 320 and a smaller cross-sectional size adjacent to the first inner end 202.

In the illustrated example, the outer attachment portion 301 (e.g., comprising the outer attachment flange 300, the intermediate wall 310, and the outer attachment wall 304) can be received within the groove 326. The outer attachment portion 301 can therefore be received between the inner attachment flange 320, the inner attachment wall 324, and an inner support wall 360. In this manner, the outer attachment portion 301 is limited from being inadvertently removed from the groove 326, thus assisting in attaching the inner container 200 and the outer container 240.

Figure 4:
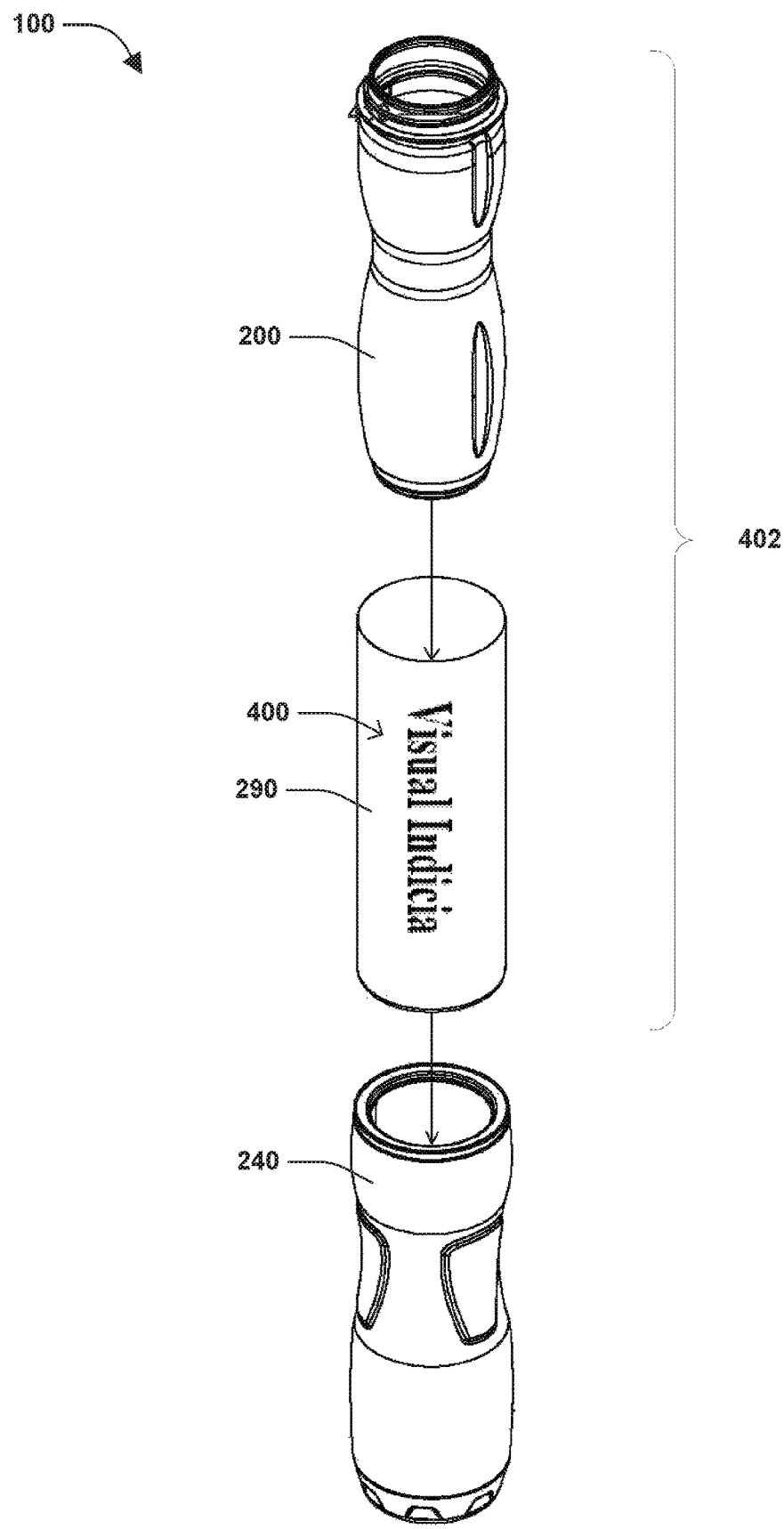
FIG. 4 is an illustration of a portion of an example insulated bottle.

Turning to FIG. 4, an exploded view of the example insulated bottle 100 is illustrated. It will be appreciated that the insulated bottle 100 is illustrated as being exploded for the purposes of illustration. However, in operation, the insulated bottle 100 may be fully assembled in a manner similar to the examples illustrated with respect to FIGS. 1 and 2.

In an example, the label 290 can first be positioned to surround the inner container 200. Next, the label 290 can be adhered to the inner container 200, such as by heat shrinking the label 290. The label 290 adhered to the inner container 200 can form an inner structure 402. This inner structure 402 can be inserted into the outer container 240. Once the inner structure 402 (e.g., comprising the inner container 200 and the label 290) has been inserted into the outer container 240, the inner container 200 and the outer container 240 can be attached.

Figure 5:
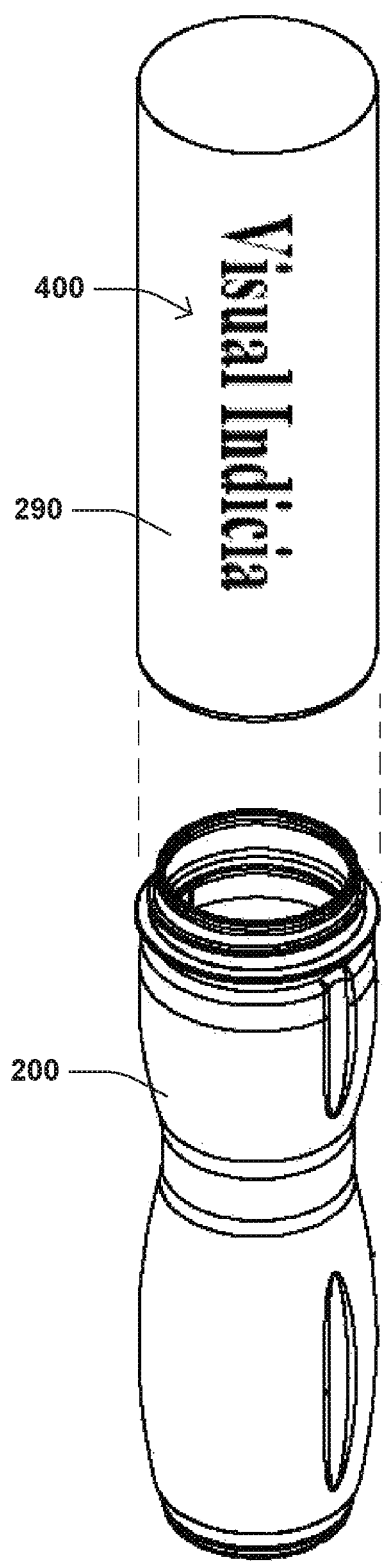
FIG. 5 is an illustration of a portion of an example insulated bottle.

Referring now to FIGS. 5 to 9, an example method of manufacturing the insulated bottle 100 is illustrated. FIG. 5 illustrates an example of surrounding the inner container 200 with the label 290. As illustrated, the label 290 can initially be positioned to circumferentially surround the inner container 200. The label 290 may have a shape that does not match the shape of the inner container 200. That is, for example, the label 290 may have a substantially cylindrical shape while the inner container 200 may have the hourglass shape. The label 290 can be positioned to surround the inner container 200 in any number of ways, such as by an automated process (e.g., with machinery, a pick and place device, etc.), a manual process (e.g., with a user placing the label 290 around the inner container 200), etc.

Figure 6:
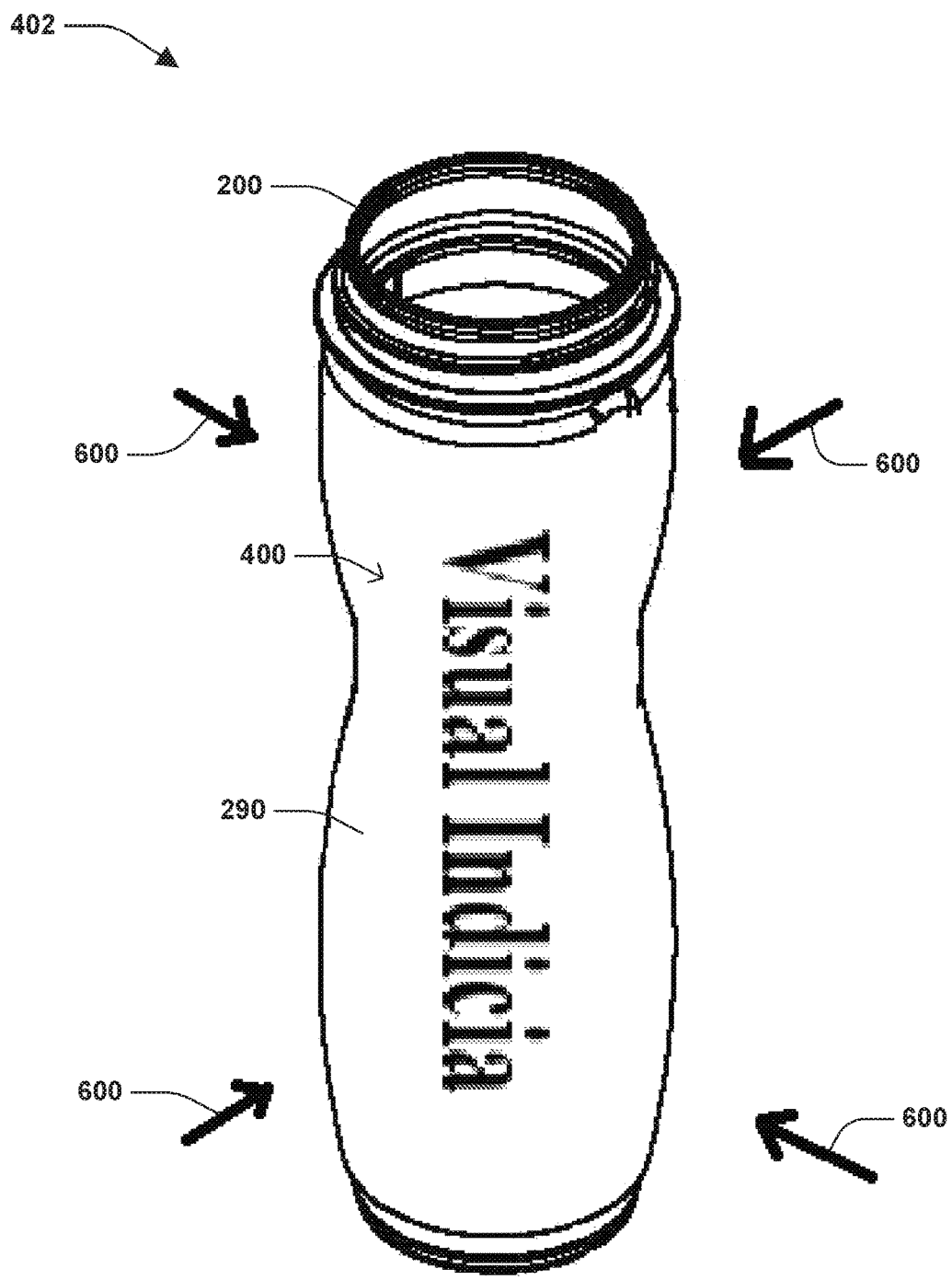
FIG. 6 is an illustration of a portion of an example insulated bottle.

Turning to FIG. 6, the method comprises adhering the label 290 onto the inner container 200 to form the inner structure 402. In an example, the label 290 can be adhered to the outer surface 276 of the inner wall 206. The label 290 can be adhered in any number of ways, such as by shrink wrapping. In such an example, the shrink wrapping may comprise heating 600 the label 290 and/or the inner container 200 at a set temperature for a predetermined amount of time. In an example, the label 290 and the inner container 200 can be passed through a heating structure (e.g., a housing that defines a heated cavity through which the inner container 200 and the label 290 pass). As the inner container 200 and the label 290 pass through the heating structure, heat 600 is applied to the label 290 for the predetermined amount of time. This heating 600 can cause the label 290 to shrink and constrict around the inner container 200. As a result of this shrink wrapping, the label 290 can possess a shape of the inner container 200 (e.g., the hourglass shape in this example). With the label 290 shrink wrapped onto the inner container 200, the label 290 and the inner container 200 can together form the inner structure 402.

Figure 7:
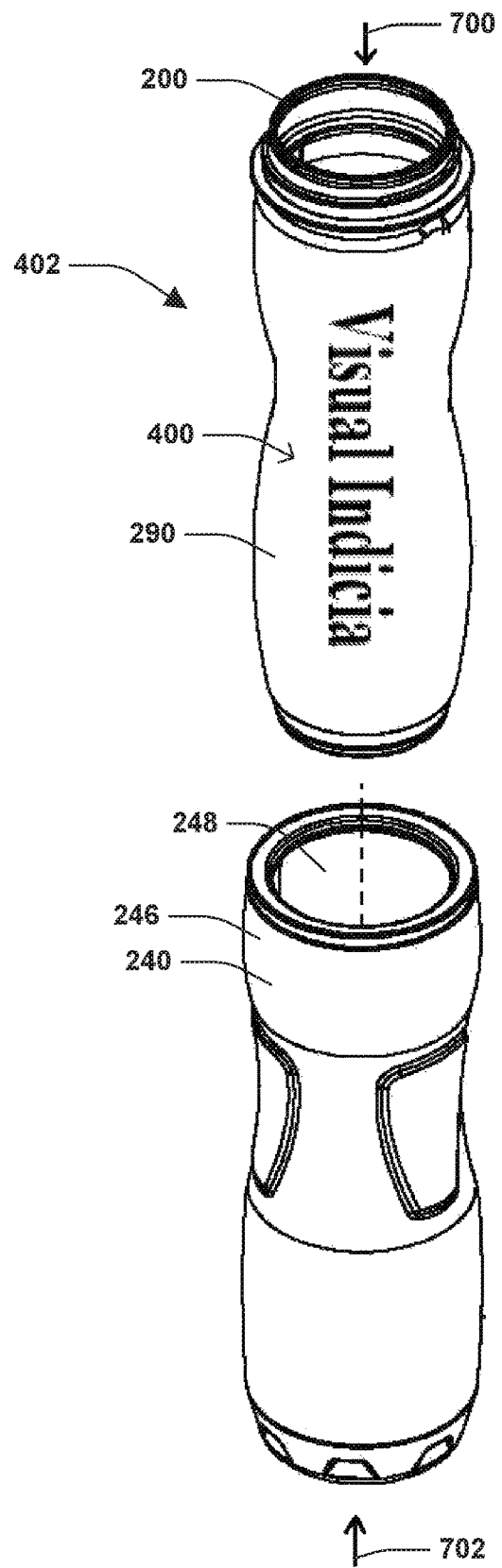
FIG. 7 is an illustration of a portion of an example insulated bottle.

Turning to FIG. 7, the method comprises inserting the inner structure 402 within the outer chamber 248 defined by the outer wall 246 of the outer container 240. In an example, to assist in inserting the inner structure 402 into the outer chamber 248, a force may be applied to the inner structure 402 (e.g., to the inner container 200) and/or to the outer container 240. For example, a first force 700 may be applied to the inner container 200 along a first direction towards the outer container 240. In addition or in the alternative, a second force 702 may be applied to the outer container 240 along a second direction towards the inner container 200, wherein the first direction and the second direction are opposing each other.

In this example, the first force 700 and the second force 702 may be sufficient to overcome any frictional forces that exist when the inner structure 402 contacts an inner surface of the outer container 240. For example, as described herein, a maximum cross-sectional size of the inner container 200 (e.g., at the first location 216 and/or at the third location 228) may be greater than a minimum cross-sectional size of the outer container 240 (e.g., at the second location 262). As such, portions of the inner container 200 (e.g., at the maximum cross-sectional size locations) can contact portions of the outer container 240 (e.g., at the minimum cross-sectional size locations) when the inner container 200 is inserted into the outer container 240. In this example, the first force 700 and/or the second force 702 may be large enough to overcome friction forces resulting from this contact. In some examples, the material forming the inner container 200 and/or the outer container 240 may have at least some degree of flexion, bending, plasticity, etc. so as to bend or flex in response to these forces. For example, when portions of the inner container 200 contact portions of the outer container 240, the inner container 200 may flex radially inwardly while the outer container 240 may flex radially outwardly. As such, the inner container 200 can be inserted into the outer chamber 248 of the outer container 240.

The first force 700 and/or the second force 702 can be applied in any number of ways. In a possible example, a user can manually apply the first force 700 and the second force 702. In another example, the first force 700 and/or the second force 702 can be applied as part of a pneumatically driven process, which may incorporate one or more pneumatic structures. For example, the outer container 240 may be held in place while the first force 700 is applied to the inner container 200 (e.g., via a pneumatically driven process) to force the inner container 200 into the outer container 240.

Figure 8:
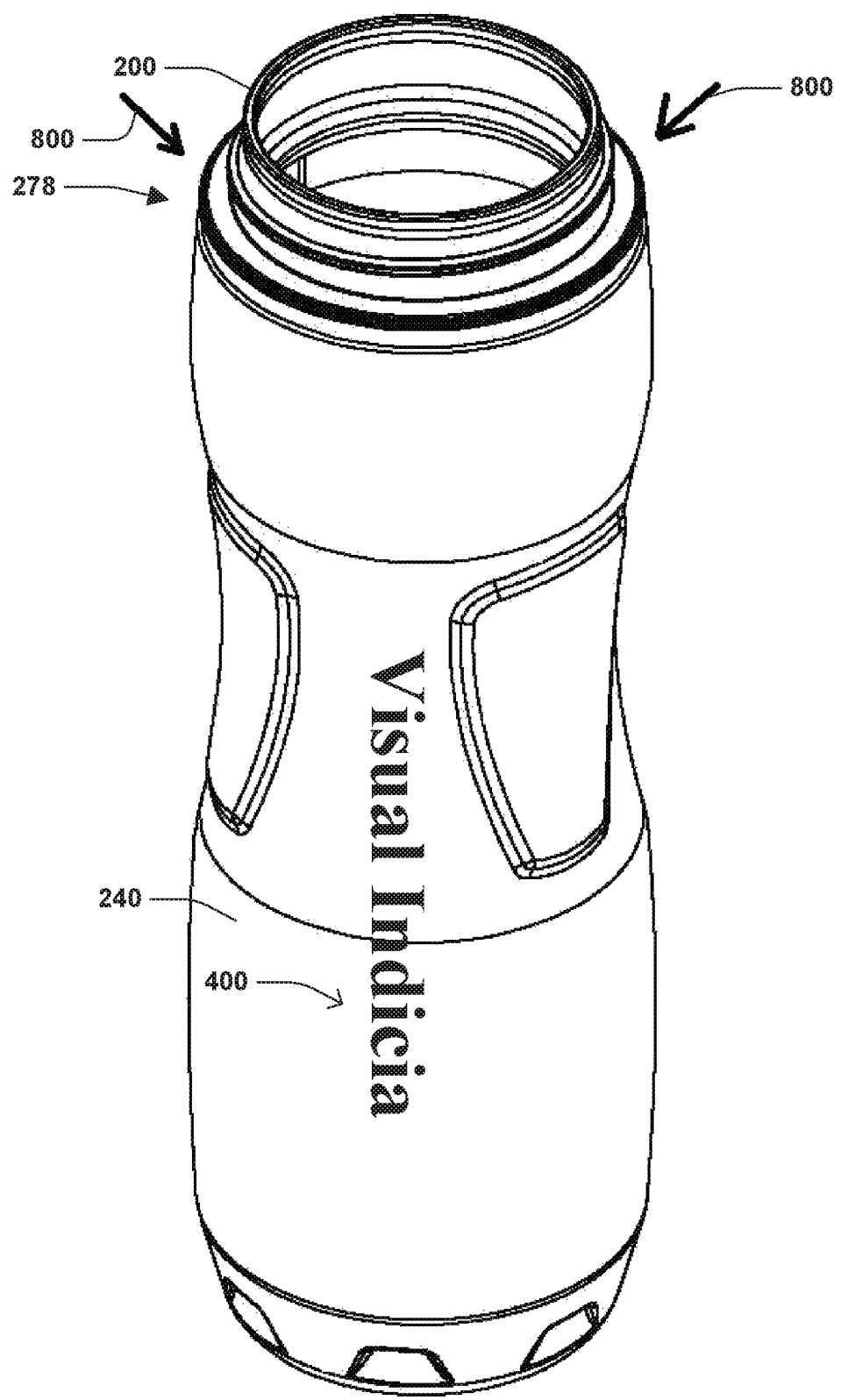
FIG. 8 is an illustration of a portion of an example insulated bottle.

Turning to FIG. 8, the method comprises attaching the first outer end 242 of the outer container 240 to the inner container 200. In this example, the outer container 240 can be attached to the inner container 200 at the attachment location 278. The attachment can comprise applying a force to the outer container 240 and the inner container 200, and heating the outer container 240 and the inner container 200. It will be appreciated that the force application and the heating are illustrated schematically at 800, as the force application and the heating may occur in proximity to the attachment location 278.

In an example, the force application can comprise pressing the outer attachment flange 300 and the inner attachment flange 320 (e.g., illustrated in FIG. 3) into contact with each other. For example, an upward force may be applied within the gap 306 from below the outer attachment flange 300 while a downward force may be applied from above the inner attachment flange 320. As such, the gap 306 can serve as a gripping location for when forces are applied to the outer attachment flange 300 and the inner attachment flange 320.

With the force applied to the outer attachment flange 300 and the inner attachment flange 320, the outer attachment flange 300 and the inner attachment flange 320 can be heated. For example, the outer attachment flange 300 and the inner attachment flange 320 can be heated to a temperature that causes melting and bonding of the outer attachment flange 300 and the inner attachment flange 320. As such, the combination of the force application and the heating can cause the outer container 240 to be attached to the inner container 200.

In addition to or in the alternative of the aforementioned steps of applying the force and heat, in some examples, an adhesive may be used to assist in attaching the inner container 200 and the outer container 240. For example, the adhesive can be used to attach the outer attachment flange 300 and the inner attachment flange 320. The adhesive may comprise an epoxy or other materials that are capable of assisting in attaching the outer attachment flange 300 and the inner attachment flange 320.

Figure 9:
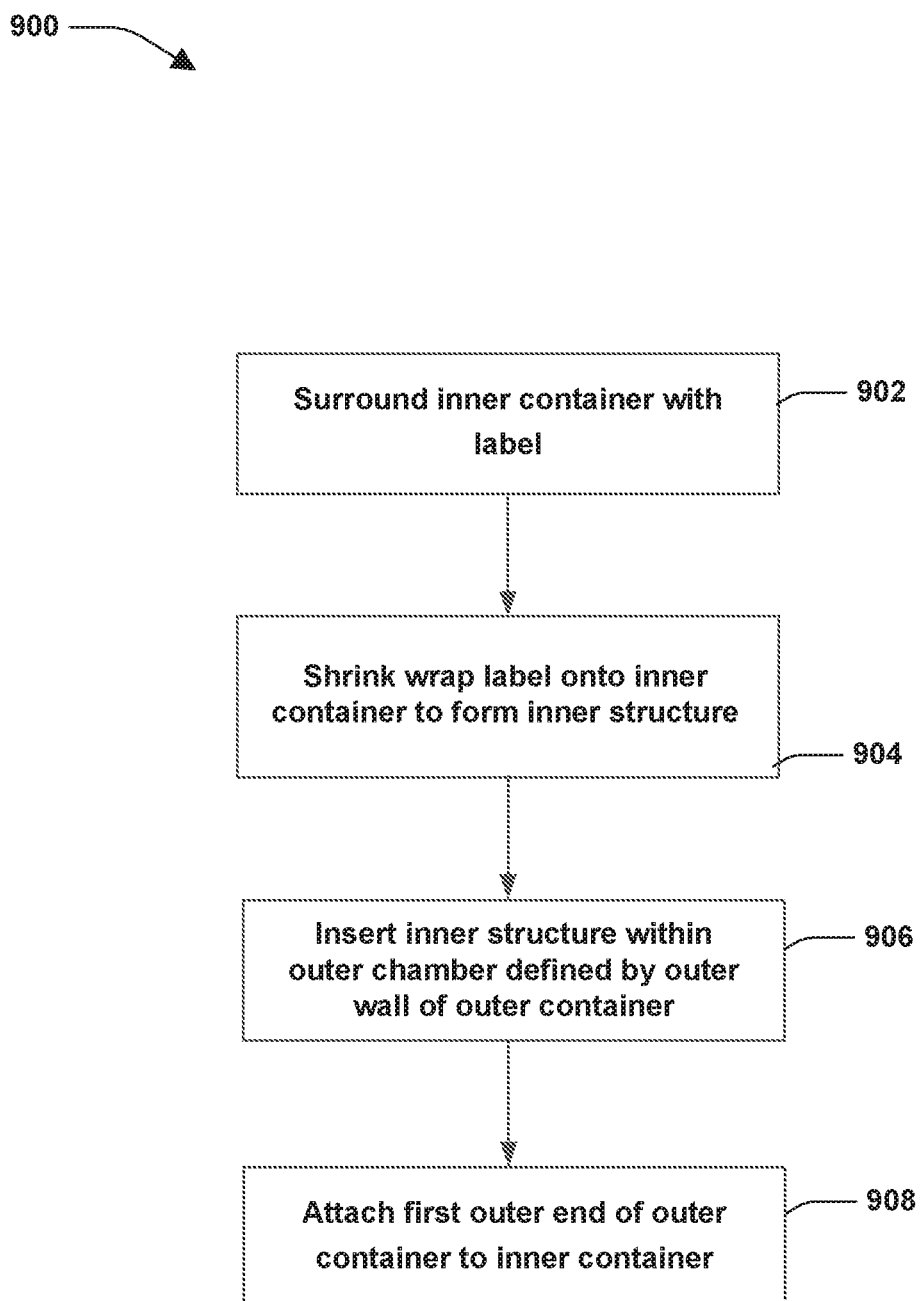
FIG. 9 is an illustration of an example method of manufacturing an insulated bottle.

Turning to FIG. 9, an example method 900 of manufacturing the insulated bottle 100 is illustrated. At 902, the method 900 comprises surrounding the inner container 200 with the label 290. At 904, the method 900 comprises shrink wrapping the label 290 onto the inner container 200 to form the inner structure 402. As a result of the shrink wrapping, the label 290 can conform to a shape of the inner container 200. At 906, the method 900 comprises inserting the inner structure 402 within the outer chamber 248 that is defined by the outer wall 246 of the outer container 240. At 908, the method 900 comprises attaching the first outer end 242 of the outer container 240 to the inner container 200.

The insulated bottle 100 provides a number of benefits. For example, the label 290 can be heat shrunk so as to adhere to the inner container 200 and substantially match a shape of the inner container 200. In such an example, substantially an entirety of the label 290 can be in contact with the inner container 200, such that gaps, spaces, air bubbles, etc. between the label 290 and the inner container 200 are substantially limited. That is, in this example, the label 290 may extend substantially parallel to the inner wall 206 of the inner container 200. In this way, the ornamental design of the label 290 is more visually appealing due to the tight fit of the label 290 on the inner container 200 as opposed to a bag or loosely fitting label. In addition, due to the relatively tight fit when the label 290 is adhered to the inner container 200, the label 290 is relatively resistant to damage and/or distortion when the inner container 200 is inserted into the outer container 240.

In another example, the insulated bottle 100 is beneficial due to the label 290 being visible. For example, the outer container 240 may be substantially clear and/or transparent, such that the label 290 may be visible to a user through the outer wall 246 of the outer container 240. In such an example, the label 290 may have the visual indicia 400 that is visible to the user. The visual indicia may comprise, for example, graphics, text, images, pictures, advertisements, logos, etc.

In yet another example, the shape of the insulated bottle 100 can confer a number of benefits. For example, as described herein, the inner container 200 and the outer container 240 can have non-constant cross-sectional sizes (e.g., diameters) as measured along the first axis 212. As a result, the inner container 200 can have portions that have larger cross-sectional sizes and smaller cross-sectional sizes than portions of the outer container 240. For example, a bottom of the inner container 200 can have a larger cross-sectional size than a cross-sectional size of a central portion of the outer container 240. As a result, the inner container 200 can tend to remain within the outer container 240 and is relatively resistant from being inadvertently removed from the outer container 240.

In another example, the structure of the insulated bottle 100 can provide benefits in the manufacturing process. For example, the gap 306 may be provided within the outer container 240 to allow for relatively easier gripping of the outer container 240. Further, the gap 306 can allow for a force to be applied to the outer container 240, so as to assist in the attachment of the inner container 200 and the outer container 240.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An insulated bottle comprising:
    an inner container having an inner wall that defines an inner chamber within which a product is received, the inner container having a first horizontal cross-sectional size at a first location;
    an outer container having an outer wall that defines an outer chamber, the inner container configured to be received within the outer chamber of the outer container such that the first location of the inner container is within the outer chamber, a space defined between the inner wall and the outer wall, the outer container having a second horizontal cross-sectional size at a second location, wherein
        the inner container has a third horizontal cross-sectional size at a third location, and the third location of the inner container is within the outer chamber,
        the second location is between the first location and the third location,
        the first horizontal cross-sectional size is larger than the second horizontal cross-sectional size, and
        the third horizontal cross-sectional size is larger than the second horizontal cross-sectional size; and
    a label shrink wrapped to an outer surface of the inner wall of the inner container, the label positioned within the space defined between the inner wall and the outer wall.

2. The insulated bottle of claim 1, wherein the outer container is attached to the inner container at an attachment location between a first inner end and a second inner end of the inner container.

3. The insulated bottle of claim 2, wherein the outer wall has an outer attachment flange extending along an outer plane that is substantially perpendicular to an axis along which the outer container extends.

4. The insulated bottle of claim 3, wherein the inner wall has an inner attachment flange extending along an inner plane that is substantially perpendicular to the axis, the outer attachment flange attached to the inner attachment flange.

5. The insulated bottle of claim 4, wherein the inner plane is substantially parallel to the outer plane.

6. An insulated bottle comprising:
    an inner container extending between a first inner end and a second inner end, the inner container having an inner wall that defines an inner chamber within which a product is received, the inner wall defining an inner opening, in fluid communication with the inner chamber, at the first inner end; and
    an outer container extending between a first outer end and a second outer end, the outer container having an outer wall that defines an outer chamber and an outer opening at the first outer end, a first inner portion of the inner container configured to be received within the outer chamber of the outer container and a second inner portion of the inner container not received within the outer chamber of the outer container, the first outer end of the outer container attached to the inner container at an attachment location between the first inner end and the second inner end of the inner container, a space defined between the inner wall and the outer wall, wherein
        the outer container comprises an outer attachment portion at the attachment location, the inner container comprises an inner attachment portion defining a groove at the attachment location, the outer attachment portion is received within the groove to attach the outer container to the inner container, and the outer attachment portion comprises:
an outer attachment wall within the groove; and
an outer attachment flange within the groove and overlying the outer attachment wall.

7. The insulated bottle of claim 6, wherein the inner container has a first horizontal cross-sectional size at a first location.

8. The insulated bottle of claim 7, wherein the outer container has a second horizontal cross-sectional size at a second location, wherein the first horizontal cross-sectional size is larger than the second horizontal cross-sectional size.

9. The insulated bottle of claim 8, wherein the inner container has a third horizontal cross-sectional size at a third location, the second location is between the first location and the third location, and the third horizontal cross-sectional size is larger than the second horizontal cross-sectional size.

10. The insulated bottle of claim 6, further comprising a label shrink wrapped to an outer surface of the inner wall of the container.

11. The insulated bottle of claim 6, wherein the inner container has a first length extending between the first inner end and the second inner end, the outer container has a second length extending between the first outer end and the second outer end, and the first length is greater than the second length.

12. The insulated bottle of claim 6, wherein the inner container extends along an axis, the inner container having a non-constant cross-sectional size along the axis.

13. The insulated bottle of claim 12, wherein the outer container extends along the axis, the outer container having a non-constant cross-sectional size along the axis.

14. The insulated bottle of claim 6, wherein the inner container has a substantially hourglass shape and the outer container has a substantially hourglass shape.

15. The insulated bottle of claim 6, wherein an intermediate wall of the outer attachment portion attaches the outer attachment flange to the outer attachment wall.

16. The insulated bottle of claim 6, wherein the outer attachment portion has a diameter that is less than a diameter of the inner attachment portion.

17. The insulated bottle of claim 6, wherein the outer attachment flange is substantially parallel to the outer attachment wall.

18. An insulated bottle comprising:
an inner container having an inner wall that defines an inner chamber within which a product is received, the inner container having a first inner horizontal cross-sectional size at a first location; and an outer container having an outer wall that defines an outer chamber, the inner container configured to be received within the outer chamber of the outer container, the outer container having a second horizontal cross-sectional size at a second location, wherein
the inner container has a third horizontal cross-sectional size at a third location,
the second location is between the first location and the third location,
the first horizontal cross-sectional size is larger than the second horizontal cross-sectional size, and
the third horizontal cross-sectional size is larger than the second horizontal cross-sectional size.

19. The insulated bottle of claim 18, wherein
the outer container comprises an outer attachment portion having a first portion spaced apart from an overlying second portion,
the inner container comprises an inner attachment portion defining a groove, and
the outer attachment portion is received within the groove to attach the outer container to the inner container.

20. The insulated bottle of claim 18, wherein a third portion of the outer attachment portion attaches the first portion of the outer attachment portion to the second portion of the outer attachment portion.

* * * * *